C. VAN DYKE.
DIRECTION SIGNALING DEVICE FOR VEHICLES.
APPLICATION FILED APR. 6, 1922.
1,430,126.
Patented Sept. 26, 1922.
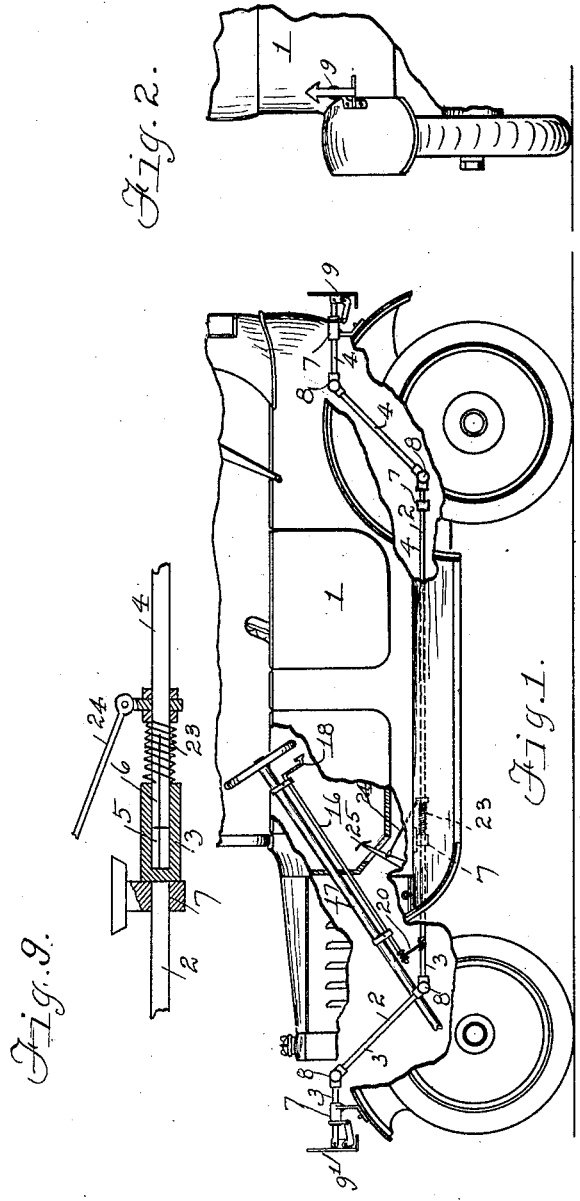
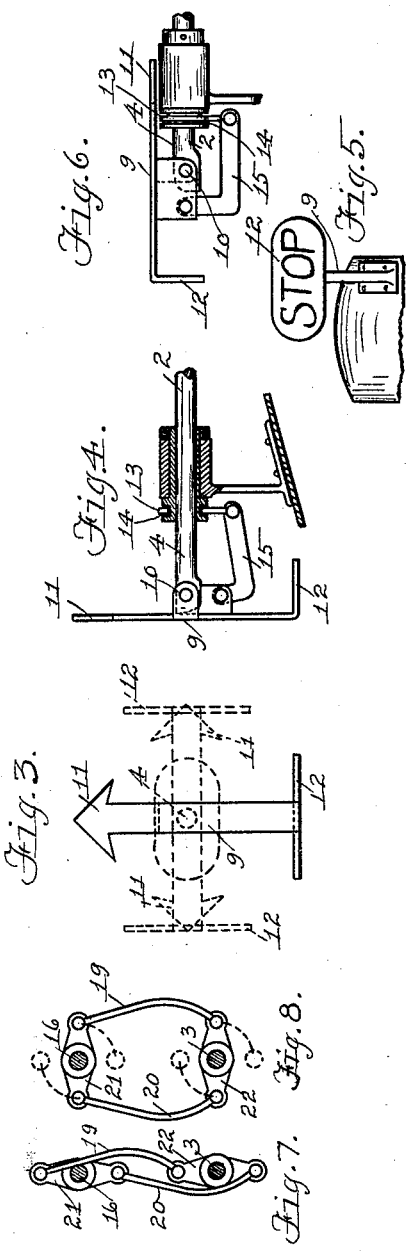
Witness:
Geo L. Chapel
Inventor:
Clayton Van Dyke
by Cyrus W. Rice
Attorney Patented Sept. 26, 1922.

1,430,126

UNITED STATES PATENT OFFICE.

CLAYTON VAN DYKE, OF GRAND RAPIDS, MICHIGAN.

DIRECTION-SIGNALING DEVICE FOR VEHICLES.

Application filed April 6, 1922. Serial No. 549,987.

*To all whom it may concern:*

Be it known that I, CLAYTON VAN DYKE, a citizen of the United States, residing at Grand Rapids, in the county of Kent and State of Michigan, have invented new and useful Improvements in Direction-Signaling Devices for Vehicles, of which the following is a specification.

The present invention relates to direction-signaling devices for vehicles; and its object is to provide a readily and economically constructed and easily operated device of that character, whereby the direction the vehicle is about to take or a stop it is about to make may be clearly indicated.

This object is attained by, and the invention finds preferable embodiment in, the device hereinafter particularly described in the body of this specification and illustrated by the accompanying drawings, in which—

Figure 1 is a side view of an automobile (its side being partially broken away), to which my signaling device is applied;

Figure 2 is a rear view of a portion of the same;

Figure 3 is a face view of a signal in one position;

Figure 4 is a side view of the same in said position;

Figure 5 is a face view of a signal in another position;

Figure 6 is a side view of the same in said position;

Figure 7 shows a part of the means for operating the signal;

Figure 8 shows the same in another position; and

Figure 9 shows, partially in section, the connection between the two sections of the operating rod.

In the embodiment of the invention chosen for illustration by the drawings and for detailed description in the body of this specification, my signaling device is applied to the automobile 1, and comprises an operating rod 2 formed in two sections 3, 4 splinedly connected, as by the squared socket 5 in section 3 which receives the squared end 6 of section 4, so that these sections must turn together but are slidably movable relatively to each other. The sections turn in bearings 7, the rear section 4 also sliding in its bearings. To accommodate the rod 2 to conveniently placed positions of the signals themselves, each section thereof may be composed of parts connected by universal joints indicated at 8, whereby rotary motion is transmitted from one part of the section to the other parts. The rear section 4 of the rod carries the signaling member 9 mounted thereon swingably on an axis 10 transverse to said section of the rod. This member 9 has a plurality of signals, viz., the pointer signal 11 and the "stop" signal 12 disposed at right angles to the face of the pointer signal, and desirably displaying the word "stop." A collar 13 rotatable on the rod's section 4 but held against movement relatively to said section in its longitudinal direction, as by being guided in an annular groove 14 as shown in Figure 4, is connected with the signal member 9 by the link 15 pivoted to said collar and said member. It will be seen that when the rod's section 4 is slid forward the signal member 9 is swung on its pivotal mounting 10 into the position seen in Figures 5 and 6 whereby the intention of the driver to stop the vehicle is indicated; and that when this rod 2 is turned so that the pointer signal assumes the position seen in dotted lines at the right-hand side of Figure 3 the intention to turn to the right is indicated; while by turning this rod half a turn in the opposite direction, so that the pointer signal assumes the position seen in dotted lines at the left-hand side of Figure 3 the intention to turn to the left is indicated. When the pointer is in upright position shown in Figures 1, 2, 4 and by solid lines in Figure 3, the intention to continue the direction of the vehicle's movement straight ahead is indicated.

A signal member $9^1$ may also be disposed on the front end of the front section 3 of the rod 2 as shown, but in this case it may consist merely of the pointer signal. The rod 2 may be turned half a revolution by any suitable means, as by the shaft 16, turnably carried in convenient position as on the steering post 17 of the automobile as shown, and furnished with a crank handle 18. Rotary or rocking motion may be transmitted from this shaft 16 to the rod 2 as by the links 19, 20 connecting the ends of the arms 21, 22 carried by said shaft and rod respectively. A spring 23 is preferably provided to press apart the two sections 3, 4 of the rod, and cushion the forward sliding movement of the rear section 4 which sliding movement may be effected as by the link 24 pivoted to the rear section and to the lever 25 which operates the brake of the automobile.

It will be seen that the sliding and turning movements of the rod cannot interfere with each other in the practical operation of my device.

The invention being intended to be pointed out in the claims, is not to be limited to or by details of construction of the particular embodiment thereof illustrated by the drawings or hereinbefore shown or described.

I claim:

1. In a device of the character described; a rod having independently turnable and slidable movements; a signaling member turnable therewith and having also a swinging movement relatively thereto, and carrying a plurality of signals; said member being swingably movable by the rod in its sliding movement to display one of said signals and turnable with the rod in its turning movement to display another of said signals in a plurality of positions.

2. In a device of the character described; a rod having independently turnable and slidable movements; a signaling member carrying a pointer signal and a stop signal, and mounted on the rod swingably on an axis transverse thereto, and being swingable on said axis by the sliding movement of the rod to display the stop signal, and turnable with the rod by its turning movement to display the pointed signal in a plurality of positions.

3. In a device of the character described; a rod having independently turnable and slidable movements; a signaling member carrying a pointed signal and a stop signal and mounted on the rod swingably on an axis transverse thereto; a collar carried by the rod and held against movement in the rod's longitudinal direction; a link pivoted to the collar and to said member; the said member being swingable on its said axis by the sliding movement of the rod to display the stop signal, and turnable with the rod by its turning movement to display the pointed signal in a plurality of positions.

4. In a device of the character described; a rod comprising splinedly-connected turnably-mounted sections; means for turning the rod; means for longitudinally moving one of said sections; a signaling member turnable with the longitudinally-movable section of the rod and having also a swinging movement relatively thereto independent of its turnable movement, and carrying a plurality of signals; said member being swingably movable by the longitudinally-movable section of the rod in its longitudinal movement to display one of said signals and turnable with the rod in its turning movement to display another of said signals in a plurality of positions.

5. In a device of the character described; a rod comprising splinedly-connected turnably-mounted sections spring-pressed apart; means for turning the rod; means for longitudinally moving one of said sections; a signaling member turnable with the longitudinally-movable section of the rod and having also a swinging movement relatively thereto independent of its turnable movement, and carrying a plurality of signals; said member being swingably movable by the longitudinally-movable section of the rod in its longitudinal movement to display one of said signals and turnable with the rod in its turning movement to display another of said signals in a plurality of positions.

In testimony whereof I have hereunto set my hand at Grand Rapids, Michigan, this 30th day of March, 1922.

CLAYTON VAN DYKE.